United States Patent [19]

Robache

[11] Patent Number: 5,065,563

[45] Date of Patent: Nov. 19, 1991

[54] PACKAGING MACHINE FOR CLOSING PACKAGING TRAYS OR THE LIKE AFTER FILLING, BY WELDING A FILM OF THERMOPLASTIC MATERIAL

[75] Inventor: Patrick Robache, Paris, France

[73] Assignee: Mecaplastic, Bagnolet, France

[21] Appl. No.: 600,999

[22] Filed: Oct. 19, 1990

[30] Foreign Application Priority Data

Oct. 20, 1989 [FR] France .................. 89 13754

[51] Int. Cl.$^5$ ............................................. B65B 31/02
[52] U.S. Cl. .......................................... 53/69; 53/282
[58] Field of Search ..................... 53/69, 67, 367, 510, 53/271, 485, 282, 287, 285, 284.5

[56] References Cited

U.S. PATENT DOCUMENTS

| | | | |
|---|---|---|---|
| 3,283,469 | 11/1966 | McBrady et al. | 53/485 X |
| 3,492,773 | 2/1970 | Bergstrom | 53/485 X |
| 3,717,971 | 2/1973 | Naggert | 53/510 X |
| 3,863,422 | 2/1975 | Wagner | 53/67 X |
| 3,874,145 | 4/1975 | Schmidt | 53/510 |
| 4,269,298 | 5/1981 | Mergl | 53/67 X |

FOREIGN PATENT DOCUMENTS 1216766 5/1966 Fed. Rep. of Germany .
7117870 12/1972 France .

Primary Examiner—James F. Coan
Attorney, Agent, or Firm—Young & Thompson

[57] ABSTRACT

Packaging trays are displaced over the entire length of a packaging machine by the horizontal top run of a single conveyor provided with a series of transverse bars which are capable in each case of pushing one of the trays and are attached to driving chains which form a closed loop with the push-bars, the packaging trays being slidably displaced on guide plates or tracks. Moreover, the control elements of the conveyor are capable of subjecting this latter to a forward displacement until a packaging tray is brought onto a platform located within the welding station, then to a slight backward displacement (R) until the corresponding push-bar has withdrawn behind the welding station in order to avoid any interference with the closing of the moving parts of the station, and finally to another forward displacement of the push-bars after completion of the welding operation.

5 Claims, 3 Drawing Sheets

PACKAGING MACHINE FOR CLOSING PACKAGING TRAYS OR THE LIKE AFTER FILLING, BY WELDING A FILM OF THERMOPLASTIC MATERIAL

BACKGROUND OF THE INVENTION

1. Field of the Invention

The present invention relates to packaging machines for closing packaging trays or the like after filling, by welding a thermoplastic film on the edges of said trays, the welding operation being performed in a vacuum or in a neutral gas atmosphere. These machines are employed for packaging a wide range of food products such as ready-cooked dishes or delicatessen products, for example.

2. Description of the Prior Art

In machines of this type, the packaging trays arrive one by one at one end of the corresponding machine in order to be subsequently conveyed one behind the other to a position opposite to the filling station, then to the station for welding the closure film, and finally to the station for discharging the closed trays. At the present time, packaging trays are conveyed between these various stations by several distinct series of different driving or transfer devices. In the majority of instances, a band conveyor or the like is provided at the input of the machine for conveying the packaging trays one behind the other to a point located opposite to the filling station, then to a point located upstream of the welding station. Each packaging tray is then transported to the welding station by lateral transfer tongs which move back after positioning of a tray within the welding station. Extraction of each tray from the welding station is also carried out by other lateral transfer tongs which carry out a back-and-forth movement. Finally, discharge is carried out by means of a band conveyor or the like.

As can readily be understood, the use of several distinct series of driving or transfer devices results in a certain complexity of the machines considered as well as a relatively high cost price. Moreover, the use of lateral transfer tongs entails the need for perfect synchronization of the operation of these latter with that of the welding station. Furthermore, the systems of transfer by means of lateral tongs require frequent adjustment operations.

For all these reasons, it would be preferable to be able to use a single conveyor for carrying out the different displacements of the packaging trays over the entire length of the machine. However, this gives rise to considerable difficulties since the means employed for displacing the packaging trays must not interfere with the good performance of the moving parts of the welding station. In a station of this type, provision is in fact made for a gas-tight enclosure constituted by two complementary moving parts, namely an upwardly displaceable bottom tank and a top bell-housing which can be applied on this latter in order to clamp between them the edges of a packaging tray and the top closure film. In order to permit free motion of these parts, it is therefore necessary to ensure that the elements for displacing the packaging trays do not in any way encroach upon the path of displacement of the moving parts of the welding station. It is in fact for this reason that transportation of each packaging tray into the welding station and its subsequent discharge from this latter had hitherto been performed by lateral transfer tongs. However, as has already been mentioned, this solution is subject to major drawbacks.

SUMMARY OF THE INVENTION

For the reasons given in the foregoing, the object of the present invention is to construct a packaging machine of the type considered in which provision is made for a single conveyor so arranged that the driving elements provided in this latter do not interfere with the good performance of the welding station in any way.

To this end, the machine in accordance with the invention has the following distinctive features:
- displacement of the packaging trays is carried out over the entire length of the machine by the horizontal top run of a single conveyor comprising a series of transverse bars which are capable in each case of pushing one of the trays and are attached to driving elements which form a closed circuit with said bars, the packaging trays being intended to slide on guide plates or tracks,
- the control means of said conveyor are capable of subjecting this latter to a forward displacement until a packaging tray is brought onto a platform located within the welding station, then to a slight backward displacement until the corresponding push-bar has withdrawn behind the welding station in order to avoid any interference with the closing of the moving parts of said station, and finally to another forward displacement of the push-bars after completion of the welding operation.

By virtue of this arrangement, displacement of the packaging trays can effectively be carried out by a single conveyor while ensuring that the conveyor parts do not constitute a hindrance to the good performance of the welding station. In addition, the basic design is such as to produce a substantial simplification of the machine as a whole and consequently an appreciable reduction of its cost price while improving the operating conditions by making provision for a single conveyor.

DETAILED DESCRIPTION OF THE INVENTION

Figure 1:
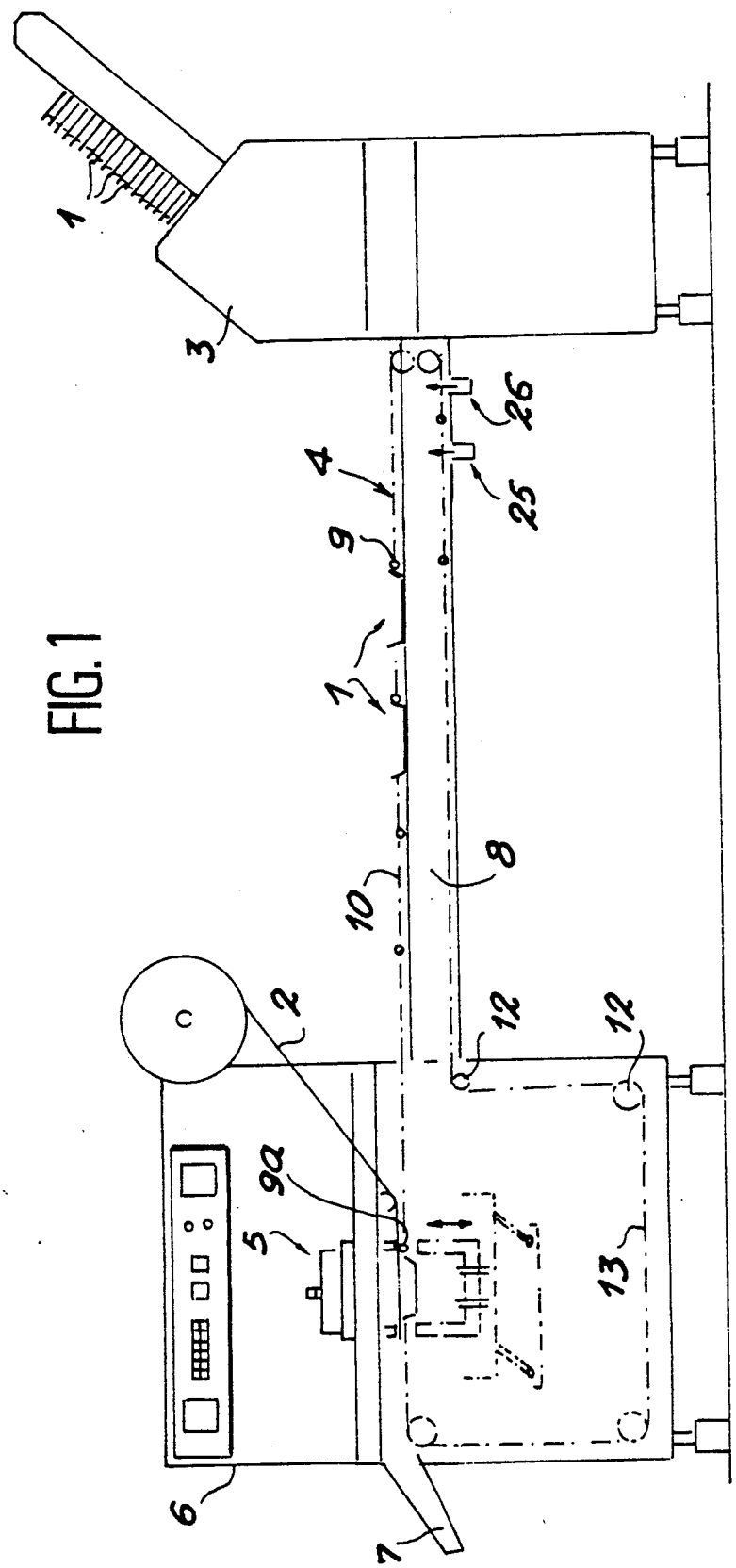
FIG. 1 is a fragmentary schematic view in side elevation showing a packaging machine in accordance with the invention.

As already mentioned, the machine in accordance with the invention is designed for packaging food products within packaging trays 1 or like containers which are closed by welding a plastic film 2 on the edges of each packaging tray.

In the present instance, consideration is given to rigid trays or similar packaging containers made by molding from thermoplastic material of a type which permits subsequent welding of the closure film 2. Said machine is provided at one end with a distributor unit 3 for delivering packaging trays 1 one by one onto the starting end of a single conveyor which is designated by the general reference 4 and extends over the entire length of the machine. Near its opposite end, said machine is equipped with a welding station designated by the general reference 5. This station is installed within a frame 6 which also carries a chute 7 for the discharge of closed packaging trays.

The frame 6 is joined to the casing of the distributor 3 by means of two side members 8 which extend opposite to the station for filling the packaging trays. The single conveyor 4 therefore starts from the distributor unit 3 and extends over the entire length of the side members 8, then over the entire length of the frame 6, so as to constitute a closed loop.

Said conveyor is provided with a series of transverse bars 9, the ends of which are attached to two side chains 10 and 11 which form a closed loop in each case. These chains are engaged on various guide sprockets 12, at least one of which is coupled with a driving mechanism (not shown in the drawings).

The top run of the closed loop or circuit thus formed extends horizontally over the entire length of the machine, above the level of horizontal guide rails 14, the packaging trays to be transferred being intended to rest on said rails. Said top run of the conveyor therefore constitutes the driving element for displacing the packaging trays 1 one behind the other. In fact, each bar 9 which is located on the top run of the conveyor serves to displace a tray 1 by exerting a thrust on the rear end of this latter. In regard to the bottom strand or return run of this closed circuit, it forms a wide loop 13 within the bottom portion of the frame 6 in order to pass around the bottom components of the welding station 5 and the mechanisms which form part of said station (as shown in FIG. 1).

Figure 4:
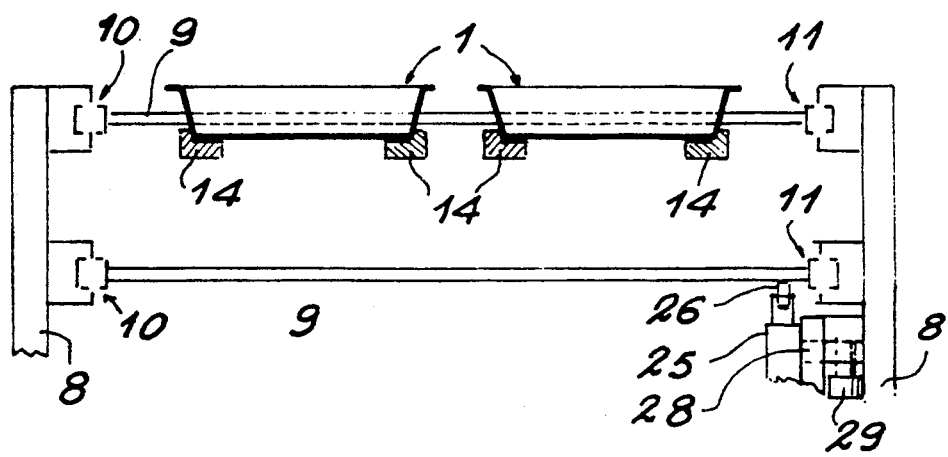
FIG. 4 is a view in cross-section taken along line IV—IV of FIG. 3.

In the example illustrated in FIG. 4, provision is made for two series of guide rails 14 so as to constitute two separate and distinct tracks which make it possible to process two parallel series of packaging trays 1. However, the present machine could very easily have only one guide track or, on the contrary, three parallel tracks or even a greater number. Depending on requirements, there therefore exists a single welding station 5 or, on the contrary, a number of welding stations located side by side within the frame 6.

Figure 2:
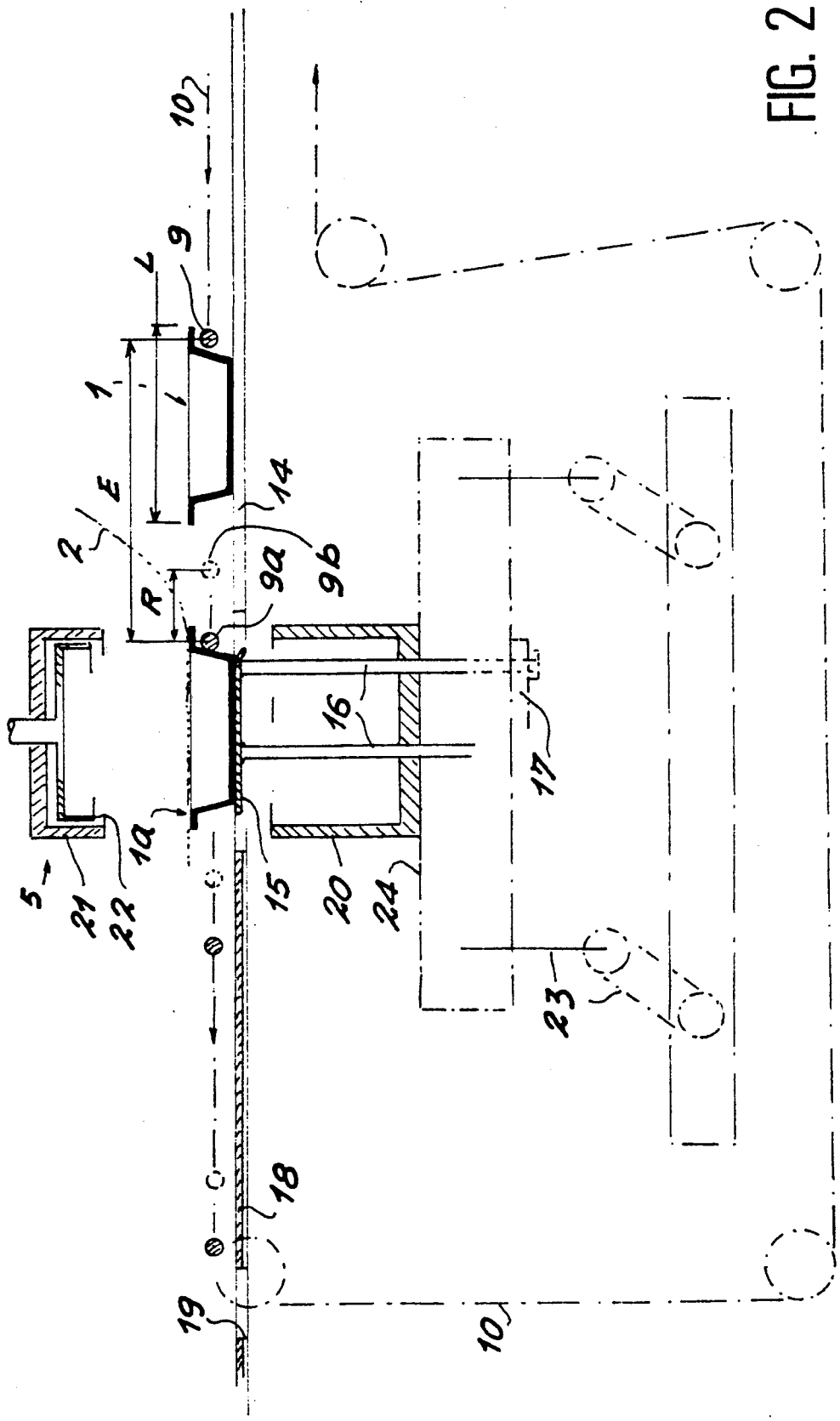
FIG. 2 is a longitudinal part-sectional view of said machine at the location of the station for closing packaging trays by welding.

Provision is made opposite to each welding station for a horizontal platform 15 which is intended to receive a packaging tray 1 for welding a portion of the closure film 2 on the edges of this latter. Said platform is carried by two columns 16 fixed on a support 17 which is rigidly fixed to the frame 6. After the platform 15, provision is made for other horizontal rails 18 which are similar to the rails 14 and are intended to receive each packaging tray 1 after welding of a portion of the closure film 2 on this latter. However, these rails 18 have an interruption 19 through which the driving chains 10 and 11 are intended to pass as well as transverse push-bars 9, as shown in FIG. 2.

In accordance with known practice, the welding station 5 comprises two complementary moving parts designed to constitute a gas-tight enclosure for carrying out welding in a vacuum or in a neutral gas atmosphere, namely a bottom tank 20 and a top bell-housing 21 which contains a welding head 22. Suitable mechanical means comprising actuating cranks 23, for example, serve to control the upward displacement of the support 24 of the bottom tank 20 so that the top edges of this latter come into position beneath the flange of the packaging tray 1a which is located within the welding station. Other mechanical driving devices (not shown in the drawings) serve to lower the top bell-housing 21 to a position in which it is applied against the bottom tank 20 so as to constitute a gas-tight enclosure. Yet other mechanical devices serve to lower the welding head 22 to its work position.

The mechanical device for driving the single conveyor of the present machine is capable of subjecting said conveyor to a forward displacement until a packaging tray 1 is located in the position 1a within the welding station on the platform 15, that is to say in the axis of said station. To this end, the transverse push-bar which serves to displace said packaging tray in forward motion is brought to the position 9a which is shown in FIG. 2 and in which the corresponding tray is placed in the position 1a. The design of the control unit of the conveyor is such that this latter is then immediately stopped in its corresponding position and subjected to a limited movement of backward displacement over a distance R. The value of this backward displacement must be such that the corresponding push-bar 9a is moved back to a position 9b in which it no longer encroaches upon the path of the moving parts of the welding station and, more precisely, on the path of the bottom tank 20 of said station (as shown in FIG. 2). As can readily be understood, the same applies to the lateral driving chains 10 and 11 which do not encroach upon the path of the moving parts of the welding station since they are set back to a sufficient distance on each side of said station.

After the push-bar has been returned to its withdrawn position 9b, the single conveyor is maintained stationary by its control unit for a sufficient length of time to permit welding of the closure film 2 on the corresponding packaging tray 1a. As soon as this operation is completed, the control unit automatically restores operation of the conveyor in forward motion. Under these conditions, the different push-bars 9 which had all been subjected to a movement of backward displacement R again come into contact with the rear ends of the packaging trays 1 which are located in front, until another tray is brought into the position 1a within the welding station, and so on in sequence.

In consequence, the single conveyor carries out a step-by-step forward movement with a stationary period corresponding to the time of welding of the closure film on a packaging tray, this stationary period being preceded by a slight movement of backward displacement R as defined earlier. Under these conditions, it should be ensured that the predetermined interval E between two successive push-bars 9 is greater than the sum of the length L of each tray 1 and of the backward displacement R to which the conveyor is periodically subjected. Compliance with this condition is necessary in order to ensure that each push-bar can have the requisite freedom of backward displacement.

The control unit of the conveyor comprises devices for checking the arrival of a packaging tray in the position 1a within the welding station 5. These checking devices are capable of initiating the movement of backward displacement R of the push-bars as described earlier.

Other checking devices are provided for supervising the performance of the movement of backward displacement imparted to the conveyor. These second checking devices are capable of stopping the conveyor as soon as this movement of backward displacement has been completed in order to permit resumption of forward displacement of the conveyor after execution of the welding operation.

In the example shown in the drawings, these two series of checking devices are constituted by two microswitches 25 and 26 placed opposite to the bottom strand or return run of the conveyor and in very special positions so that said two microswitches can be actuated respectively by two predetermined transverse bars 9c and 9d of said conveyor.

Figure 3:
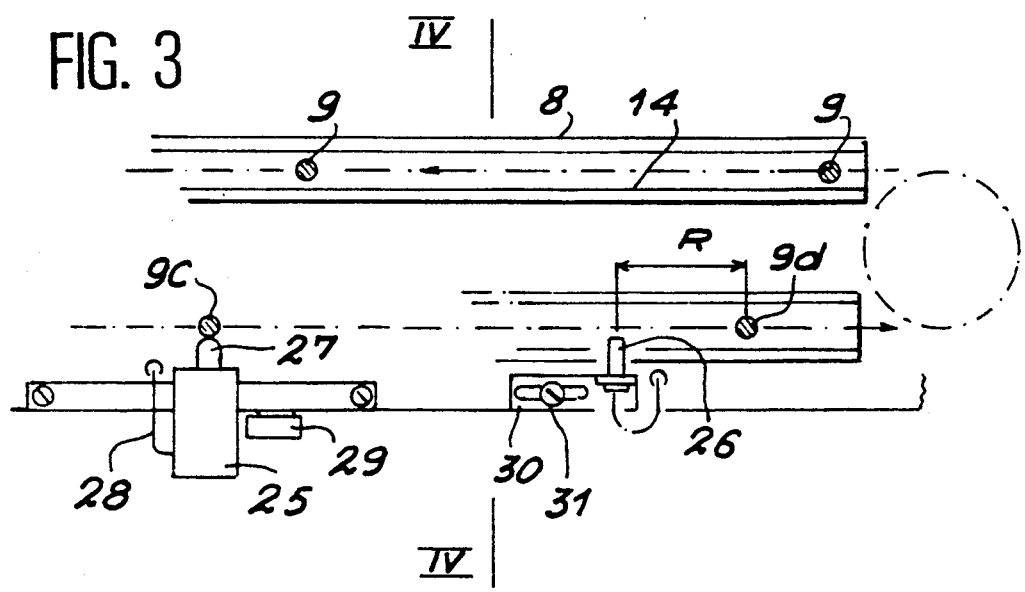
FIG. 3 is also a longitudinal part-sectional view but at another point of the machine, namely at the location of the position-control means which are provided in the example shown.

In the case considered, the microswitch 25 is positioned so as to ensure that its control member 27 is actuated by each transverse bar of the bottom run of the conveyor when this latter reaches the position 9c in FIG. 3. Now the arrangement of the conveyor is such that, when one bar of this latter reaches this position, another bar has reached the position 9a shown in FIG. 2, that is to say the position of maximum advance within the welding station prior to execution of a welding operation. In view of this arrangement, the microswitch 25 is connected in an electric circuit which initiates immediate stopping of the conveyor driving motor and its operation in the opposite direction in order to subject said conveyor to the limited backward displacement R which is intended.

In regard to the microswitch 26, this latter is placed in a position such that it is actuated by the bar 9d located in front of said microswitch when said bar has moved back over a distance R as a result of the movement of backward displacement imparted to the conveyor. Said microswitch 26 then causes the conveyor to stop during a period equal to or slightly longer than the time required for the welding operation, whereupon automatic operation of the drive system is resumed for a further advance of the conveyor until another packaging tray comes into position within the welding station 5.

Preferably, the first microswitch 25 is carried by a support 28 which is slidably mounted on the corresponding side member 8 and is immobilized in the desired position by means of a locking screw 29. The position of the microswitch 25 can be very accurately adjusted by means of this arrangement. The second microswitch 26 can also be carried by a movable support 30 which can be immobilized in the desired position by means of a locking screw 31.

The single conveyor thus provided is therefore capable of carrying out the necessary different displacements of the packaging trays 1 over the entire length of the machine without interfering with the operation of the welding station in any way. Moreover, the existence of a single conveyor offers considerable advantages over the solution which consisted in providing several different types of conveyors or other transfer means. In fact, perfect synchronism of displacements can thus be obtained without any need for other arrangements. Furthermore, this results in considerable simplification of the structure of the machine, which in turn has the advantage of reducing the cost price of the entire system. In addition, the machine in accordance with the invention has a very high degree of reliability and does not call for repeated operations involving adjustments or refinements.

It should be observed that this machine and its single conveyor are not limited to the example described in the foregoing. In fact, the two series of checking operations for supervising on the one hand the arrival of a packaging tray within the welding station and on the other hand the execution of the movement of backward displacement of the conveyor could be carried out in different ways. Thus, in regard to the first checking devices, the microswitch 25 could be replaced by a detector of the optical type or the like which is capable of detecting the arrival of a packaging tray within the welding station. In regard to the second microswitch 26, this latter could be replaced by means for automatically limiting the operation of the drive motor in the direction corresponding to the movement of backward displacement of the conveyor. In fact, instead of detecting or checking devices, consideration could be given to operation of the conveyor control unit in dependence on a programmer which automatically determines the extent of each movement of forward displacement of the conveyor, then the extent of the movement of backward displacement, and so on.

As has already been mentioned, the machine in accordance with the invention is intended to carry out the packaging of food products or the like in trays 1 or similar packaging containers which are closed by welding of a film 2. This machine can be adjusted for processing trays having different dimensions. To this end, the guide rails 14 can be movably mounted on fixed supports in order to be spaced to a greater or lesser extent according to requirements. In such a case, the parts of the welding station must also be replaced by parts having different dimensions.

What is claimed is:

1. In a packaging machine for closing packaging trays or the like after filling in a filling station, comprising means for vacuum welding a plastic film on edges of said packaging trays in said filling station, and mechanical means for displacing said trays one behind the other into said filling station and then out of said station for discharge of closed packaging trays; the improvement wherein said mechanical means comprises a single endless conveyor having an upper run having thereon a series of spaced pushers which are capable each of pushing a said tray, means for advancing said upper run of said conveyor to move a said packaging tray pushed by one said pusher into said filling station, means for thereafter moving said upper run in a reverse direction to move a said pusher backward away from said tray and said filling station a distance less than the spacing between adjacent pushers so as to permit said vacuum welding means to weld thermoplastic film on said tray in said filling station, and means for thereafter reversing movement of said upper run so that said one pusher again contacts said tray in said filling station to move said tray out of said filling station and to move into said filling station another said tray propelled by another said pusher on said conveyor.

2. A packaging machine as claimed in claim 1, in which said spacing between said pushers is greater than said distance plus the length of a said tray in the direction of conveyance of said trays.

3. A packaging machine as claimed in claim 1, and means for detecting the arrival of a said tray within said filling station, means responsive to said detecting means for initiating backward displacement of said upper run, and means for stopping the conveyor upon completion of said backward movement.

4. A packaging machine as claimed in claim 3, wherein said detecting means comprises an electric switch actuated by a said pusher.

5. A packaging machine as claimed in claim 3, wherein said means for stopping the conveyor comprises an electric switch contacted by a said pusher.

* * * * *